United States Patent [19]

Shimizu et al.

[11] Patent Number: 4,742,142

[45] Date of Patent: May 3, 1988

[54] METHOD FOR PRODUCING SILICONE RUBBER POWDER

[75] Inventors: Koji Shimizu; Mitsuo Hamada, both of Chiba, Japan

[73] Assignee: Toray Silicone Co., Ltd., Tokyo, Japan

[21] Appl. No.: 34,368

[22] Filed: Apr. 6, 1987

[30] Foreign Application Priority Data

Apr. 17, 1986 [JP] Japan ................... 61-89063

[51] Int. Cl.$^4$ ............................................. C08G 77/06
[52] U.S. Cl. ........................................ 528/15; 528/31; 528/32; 528/24; 525/478; 524/861; 524/862
[58] Field of Search ............ 524/861, 862; 528/15, 528/31, 32, 24; 525/478

[56] References Cited

U.S. PATENT DOCUMENTS 3,639,498  2/1972  Vlismas et al. .............. 524/861
4,624,900 11/1986  Fau ............................... 524/861

FOREIGN PATENT DOCUMENTS 2129820  6/1986  United Kingdom .

Primary Examiner—Melvyn I. Marquis
Attorney, Agent, or Firm—Robert Spector

[57] ABSTRACT

Powdered, cured silicone rubber in the form of microfine particles is prepared by emulsifying a curable liquid silicone rubber composition in a mixture of water and a surfactant at a temperature of from 0 to 25 degrees C., dispersing the curable composition in water heated to a temperature of at least 25 degrees C. and recovering the resultant cured particles. The liquid silicone rubber composition is preferably maintained at a temperature of from −60 to 0 degrees C. before being emulsified.

5 Claims, No Drawings ated as ppm. A requirement for the present curable liquid silicone rubber compositions is that the sum of the number of alkenyl radicals in each molecule of component (A) and the number of hydrogen atoms in each molecule of component (B) be at least 5.

METHOD FOR PRODUCING SILICONE RUBBER POWDER

BACKGROUND OF THE INVENTION

1. Field of the Invention

The present invention relates to a method for producing silicone rubber powder. More particularly, this invention relates to a method for producing silicone rubber in the form of a powder from curable liquid organosiloxane composition.

2. Description of the Prior Art

Methods known in the art for producing silicone rubber powder include pulverizing cured silicone rubber into a powder after it has been frozen with dry ice, and pulverizing cured silicone rubber into a powder using a grinder at ambient temperature. These methods suffer from the following problems: it is difficult to obtain a microfine powder, the shape of the resultant particles is very nonuniform, and their productivity is low.

Accordingly, the present inventors examined various methods which would not suffer from the aforementioned problems, and the present invention was developed as a result of these investigations.

The objective of the present invention is to provide a highly productive method for producing a microfine silicone rubber powder having a uniform shape.

SUMMARY OF THE INVENTION

The aforesaid objective is achieved by dispersing an emulsified liquid curable silicone rubber composition into water that is maintained at a temperature of at least 25 degrees C.

DETAILED DESCRIPTION OF THE INVENTION

This invention provides a method for preparing a cured silicone rubber powder in the form of microfine particles, said method comprising (1) emulsifying a curable liquid silicone rubber composition in a mixture comprising water and surfactant where said mixture is maintained at a temperature of from 0 to 25 degrees C., (2) dispersing the resultant emulsion into water maintained at a temperature of at least 25 degrees C. to cure the liquid silicone rubber composition into a powder, and (3) isolating the cured powder.

The present method will now be explained in detail. The curable liquid silicone rubber composition used in the present invention is a liquid or a paste at ambient temperature and is based on a liquid, reactive group-containing organopolysiloxane, a crosslinker for the organopolysiloxane and/or a curing catalyst. The silicone rubber compositions cures into a rubbery elastomer by standing under ambient conditions or by heating. Both self supporting and non-self supporting types of curable liquid compositions are permissible. With regard to the curing mechanism of the compositions, the present method can utilize addition-reaction types, organoperoxide-based radical reaction-curing types and condensation-reaction types. Addition-reaction types are preferred due to their rapid curing rate and excellent uniformity in curing.

Particularly preferred addition-reaction type liquid silicone rubber compositions are those comprising (A) an organopolysiloxane having at least 2 lower alkenyl radicals in each molecule, (B) an organopolysiloxane having at least 2 silicon-bonded hydrogen atoms in each molecule, and (C) as the curing catalyst a platinum-group metal or a compound of said metal at a concentration equivalent to from 0.1 to 1,000 parts by weight of a platinum-group metal per million parts by weight of combined components (A) and (B), hereinafter designated as ppm. A requirement for the present curable liquid silicone rubber compositions is that the sum of the number of alkenyl radicals in each molecule of component (A) and the number of hydrogen atoms in each molecule of component (B) be at least 5.

Component (A) is the principal component of the preferred liquid silicone rubber compositions, and it reacts with component (B) under the catalytic activity of component (C) to produce a cured silicone rubber. Component (A) must contain at least 2 lower alkenyl radicals bonded to silicon in each molecule. When less than 2 of these lower alkenyl radicals are present, a network structure cannot be formed, and a good cured product cannot be obtained. The lower alkenyl radicals present in component (A) are exemplified by vinyl, allyl, and propenyl. The lower alkenyl radicals can be present at any position in the molecule, but they are preferably present at least at the molecular terminals. Furthermore, the molecular configuration of component (A) can be straight chain, branch-containing straight chain, cyclic, or network, but a straight chain configuration, possibly slightly branched, is preferred. The molecular weight of this component is not specifically restricted. While the viscosity may range from that of a low-viscosity liquid to a very high-viscosity gum, the viscosity at 25 degrees C. is preferably no more than 100 cP (0.1 Pa.s) in order to obtain a rubbery elastomeric cured material.

Suitable vinyl-containing organopolysiloxanes include but are not limited to methylvinylpolysiloxanes, methylvinylsiloxane-dimethylsiloxane copolymers, dimethylvinylsiloxy-terminated dimethylpolysiloxanes, dimethylvinylsiloxy-terminated dimethylsiloxane-methylphenylsiloxane copolymers, dimethylvinylsiloxy-terminated dimethylsiloxane-diphenylsiloxane-methylvinylsiloxane copolymers, trimethylsiloxy-terminated dimethylsiloxane-methylvinylsiloxane copolymers, trimethylsiloxy-terminated dimethylsiloxane-methylphenylsiloxane-methylvinylsiloxane copolymers, dimethylvinylsiloxy-terminated methyl(3,3,3-trifluoropropyl)polysiloxanes, dimethylvinylsiloxy-terminated dimethylsiloxane-methyl(3,3,3-trifluoropropyl)siloxane copolymers, and polysiloxanes composed of $CH_2=CH(CH_3)_2SiO_{\frac{1}{2}}$, $(CH_3)_3SiO_{\frac{1}{2}}$ and $SiO_{4/2}$ units. Combination of two or more of the aforesaid organopolysiloxanes can be used in the present invention.

Component (B) of the present preferred composition is the crosslinker for component (A). Curing proceeds by the addition reaction of the silicon-bonded hydrogen atoms in this component with the lower alkenyl radicals in component (A) under the catalytic activity of component (C). Component (B) must contain at least 2 silicon-bonded hydrogen atoms in each molecule in order to function as a crosslinker.

The sum of the number of alkenyl radicals in each molecule of component (A) plus the number of silicon-bonded hydrogen atoms in each molecule of component (B) must be at least 5. It is undesirable for this sum to be less than 5 because a network structure essentially cannot then be formed, and an excellent cured article cannot be obtained.

The molecular configuration of component (B) is not specifically restricted, and it can be straight chain, branch-containing straight chain, or cyclic. While the molecular weight of this component is similarly not specifically restricted, the viscosity at 25 degrees C. is preferably from 1 to 50,000 cP (0.001 to 50 Pa.s) in order to obtain a good miscibility with component (A).

The quantity of addition of component (B) is preferably defined by the condition that the molar ratio of the total number of silicon-bonded hydrogen atoms in this component to the total quantity of all lower alkenyl radicals in component (A) is from 0.5:1 to 20:1. When this molar ratio is less than 0.5:1, a well cured composition will not be obtained. When this molar ratio exceeds about 20:1, there is a tendency for the hardness of the cured composition to increase when heated. Furthermore if additional resinous organosiloxanes having large concentrations of alkenyl radicals are added to the present compositions for the purpose of reinforcement or other reason, it is preferred that a supplementary amount of component (B) be added to react with these additional alkenyl radicals.

Examples of this component (B) include but are not limited to trimethylsiloxy-terminated methylhydrogenpolysiloxanes, trimethylsiloxy-terminated dimethylsiloxane-methylhydrogensiloxane copolymers, dimethylhydrogensiloxy-terminated dimethylsiloxane-methylhydrogensiloxane copolymers, dimethylsiloxane-methylhydrogensiloxane cyclic copolymers, copolymers composed of $(CH_3)_2HSiO_{\frac{1}{2}}$ units and $SiO_{4/2}$ units, and copolymers composed of $(CH_3)_3SiO_{\frac{1}{2}}$ units, $(CH_3)_2HSiO_{\frac{1}{2}}$ units, and $SiO_{4/2}$ units.

Component (C) is a catalyst for the addition reaction of silicon-bonded hydrogen atoms with alkenyl radicals. Suitable catalysts include metals from the platinum group of the periodic table of the elements and compound of these metals. Concrete examples of catalysts include but are not limited to chloroplatinic acid, chloroplatinic acid dissolved in an alcohol or ketone as well as such solutions which have been ripened, chloroplatinic acid-olefin complexes, chloroplatinic acid-alkenyl-siloxane complexes, chloroplatinic acid-diketone complexes, platinum black and platinum supported on a carrier.

The concentration of component (C) in the present curable compositions is typically equivalent to from 0.1 to 1,000 ppm by weight of platinum-group metal, based on the total weight of components (A) and (B). Crosslinking will not proceed satisfactorily at below 0.1 ppm of platinum-group metal, while exceeding 1,000 ppm is uneconomical. Typically a concentration of from 1 to 100 ppm is preferred.

Filler can be present in the present curable liquid silicone rubber compositions to adjust the fluidity or improve the mechanical strength of the final cured article. Such fillers are exemplified by reinforcing fillers such as precipitated silica, fumed silica, calcined silica and fumed titanium dioxide, and by non-reinforcing fillers such as quartz powder, diatomaceous earth, asbestos, aluminosilicic acid, iron oxide, zinc oxide and calcium carbonate. These fillers may be used as is, or may first be treated with an organosilicon compound such as hexamethyldisilazane, trimethylchlorosilane or a hydroxyl terminated dimethylpolysiloxane.

The present compositions that are curable by a platinum catalyzed addition reaction can also contain other additives including but not limited to pigments, heat stabilizers, flame retardants, plasticizers and organopolysiloxanes having 1 alkenyl radical per molecule, the latter being for the purpose of reducing the modulus of the final cured article.

A small or very small amount of a curing reaction-retarding additive such as an acetylenic compound, a hydrazine, a triazole, a phosphine or a mercaptan can be added to the present curable compositions unless this adversely affects the objective of the invention.

A second preferred type of curable liquid silicone rubber composition cures by a free radical mechanism initiated by decomposition of an organoperoxide. These compositions comprise a vinyl-containing diorganopolysiloxane which is liquid at room temperature, and a catalytic quantity of an organoperoxide. Inorganic fillers, for example, fumed silica or precipitated silica, heat stabilizers, and pigments can be added as necessary. The organoperoxide is preferably selected from among those with decomposition temperatures in the range of from 25 to 100 degrees C.

In accordance with the present method the ingredients of the liquid silicone rubber composition are combined and blended at temperatures of from $-60$ to $+5$ degrees C., and preferably within the range of from $-30$ to 0 degrees C. This is because the organopolysiloxanes used in the present invention tend to gel at temperatures below $-60$ degrees C., and so cannot be readily processed. The compositions begin to cure during mixing at temperatures above $+5$ degrees C. In either instance it is difficult to produce a uniform emulsion.

In accordance with the present method a curable liquid silicone rubber composition produced using any of the methods described hereinabove is emulsified by blending it with water in the presence of a surfactant and within the temperature range of from 0 to 25 degrees C.

The emulsion can be prepared by a number of methods. In accordance with one of these methods, water and surfactant are added to the liquid silicone rubber compositions, and this is passed through a commercial homogenizer to form the emulsion. In another method, the constituent ingredients of the curable liquid silicone rubber composition are placed in a homomixer, the surfactant is added and mixed, and water is then added followed by stirring.

The surfactants useful for forming the emulsion are not specifically restricted and include any of the nonionic and anionic surfactants and emulsifying agents that have heretofore been employed for this purpose. It should be understood that surfactants containing elements which can cause a loss of activity in platinum-type catalysts, for example, the sulfur or phosphorus atom should not be used in addition reaction curable compositions containing these catalysts to avoid inhibiting curing of these silicone rubber compositions.

The emulsion is preferably prepared at temperatures within the range of from 0 to 25 degrees C. It will be understood that the water will freeze at below 0 degrees C., thus preventing the formation of an emulsion. Curing of the liquid silicone rubber will occur at above 25 degrees C., with the result that the shape of the particles of cured silicone rubber powder will tend to be quite irregular.

The emulsified liquid silicone rubber composition produced as described above is cured by dispersing it into water having a temperature of at least 25 degrees C. Temperatures below 25 degrees C. are undesirable because the curing rate of the liquid silicone rubber compositions used in the present invention then declines, resulting in a tendency for the shape of the silicone rubber powder to be irregular and the production rate to be reduced.

Numerous methods can be used to disperse the emulsion in water. In one method, the emulsion is dispersed in hot water by continuously supplying it in small portions to a stirrer-equipped mixer filled with hot water having a temperature of at least 25 degrees C.

The quantity of hot water is preferably at least twice the total quantity of emulsion to be dispersed. When less than this amount of water is used there is a tendency for the shape of the produced silicone rubber powder to be irregular.

The following examples describe preferred embodiments of the present method and should not be interpreted as limiting the scope of the invention defined in the accompanying claims. All parts and percentages in the examples are by weight, and viscosities were measured at 25 degrees C.

EXAMPLE 1

One part of a two-part curable liquid silicone rubber composition was prepared by adding six parts of a trimethylsiloxy-terminated methylhydrogenpolysiloxane with a viscosity of 10 cP (0.01 Pa.s) and an SiH content of 1.0 wt % and 10 parts Denka Black (an electrically conductive carbon black from Denki Kagaku Kogyo KK with a surface of 70 m$^2$/g) to 100 parts of a dimethylvinylsiloxy-terminated dimethylpolysiloxane with a viscosity of 1,000 cP (1 Pa.s) and a vinyl group content of 0.5 wt %. The resultant mixture was blended to homogeneity to yield a mixture (mixture A) with a viscosity of 400 Poise (40 Pa.s) at a shear rate of 10 sec$^{-1}$. A second mixture (mixture B) was prepared by adding 0.3 parts of an isopropanol solution of chloroplatinic acid (platinum content=3 wt %) and 10 parts Denka Black as described above to 100 parts of the same type of dimethylpolysiloxane as described above and blending the resultant mixture to homogeneity. Mixture A was placed in a liquid silicone rubber composition tank and mixture B was similarly placed in a separate liquid silicone rubber composition tank. The two mixtures were then fed in a 1:1 weight ratio by means of metering pumps into a stirrer-equipped mixer which had been cooled to −10 degrees C. in advance. 500 Parts of the resultant curable liquid silicone rubber composition (mixture C) was fed using a pressure-delivery pump to a homomixer which had been cooled to +5 degrees C. in advance. 100 parts of a non-ionic surfactant (Tergitol TMN-6, ethylene oxide adduct of trimethylnonanol, from Union Carbide Corporation), was then added and the resultant composition was blended for 1 minute, at which time 1,000 parts ion-exchanged water was then added. An emulsified liquid silicone rubber composition was produced by mixing the contents of the homogenizer for 5 minutes at a blade rotation rate of 500 rpm. The temperature of the emulsion was +5 degrees C. at this time. This emulsion was then continuously fed into a stirrer-equipped mixer which had been filled in advance with water at +80 degrees C., and is dispersed in the water at a stirring rate of 5 rpm. A sphericl silicone rubber powder with an average particle size of 20 microns was produced.

EXAMPLE 2

One part of a two-part curable liquid silicone rubber composition was prepared by adding three parts of a trimethylsiloxy-terminated methylhydrogenpolysiloxane with a viscosity of 10 cP and an silicon bonded hydrogen content of 1 wt % to 100 parts of a dimethylvinylsiloxy-terminated dimethylpolysiloxane with a viscosity of 2,000 cP (2 Pa.s) and a vinyl content of 0.25 wt % to yield a mixture (mixture A) with a viscosity of 20 Poise. The second part of the curable liquid silicone rubber composition (mixture B), similar to mixture A described in the first part of this example, was obtained by added and mixing 0.3 part of an isopropanol solution of chloroplatinic acid (platinum content=3 wt %) into 100 parts of the same type of dimethylpolysiloxane described in the first section of this example. Mixtures A and B were placed in separate liquid silicone rubber composition tanks, and the tanks were then cooled to −30 degrees C. 250 Parts mixture A and 250 parts mixture B were fed into a homomixer which had been cooled in advance to +5 degrees C., followed by mixing to homogeneity. The temperature of the mixture at this time was +5 degrees C. 100 Parts of the nonionic surfactant described surfactant was then added and the resultant composition was mixed for one minute. 1,000 Parts of ion-exchanged water was then added and emulsification was achieved by running the homogenizer for 5 minutes at a blade speed of 800 rpm. The temperature of the emulsion was +10 degrees C. at this time. Fifty parts of the emulsion was then transferred to a stirrer-equipped flask. After the addition of 2,000 parts water having a temperature of 40 degrees C., the composition was stirred at a rate of rate of 10 rpm to afford a cured silicone rubber powder. The obtained cured silicone rubber powder was washed with water, dried, and then inspected under a microscope. The cured silicone rubber powder had an almost perfectly spherical shape with an average particle size of 10 microns.

That which is claimed is:

1. A method for preparing a cured silicone rubber powder in the form of microfine particles, said method comprising (1) emulsifying a curable liquid silicone rubber composition in a mixture comprising water and a surfactant where said mixture is maintained at a temperature of from 0 to 25 degrees C., (2) curing the liquid silicone rubber into a powder by dispersing the resultant emulsion into water maintained at a temperature of at least 25 degrees C., and (3) isolating the resultant cured powder.

2. A method according to claim 1 where said curing is obtained by either (1) a platinum catalyzed addition reaction between an organopolysiloxane containing at least two lower alkenyl radicals and an organohydrogenpolysiloxane containing at least two silicon bonded hydrogen atoms per molecule, or (2) a free radical initiated polymerization of an organopolysiloxane containing at least two vinyl radicals per molecule in the presence of an organic peroxide.

3. A method according to claim 2 where said composition cures by said platinum catalyzed addition reaction, the sum of the number of silicon bonded hydrogen atoms per molecule of said organohydrogenpolysiloxane and the number of silicon bonded lower alkenyl radicals per molecule of said organopolysiloxane is at least 5, said organopolysiloxane is a dimethylvinylsiloxy terminated dimethylpolysiloxane and said organohydrogenpolysiloxane is a methylhydrogenpolysiloxane.

4. A method according to claim 1 where the curable liquid silicone rubber composition is maintained at a temperature of from −30 to 0 degrees prior to being emulsified and the temperature of said mixture is from 5 to 10 degrees C.

5. A method according to claim 1 where said surfactant is non-ionic, the volume of the water into which the emulsion is dispersed is at least twice the volume of said emulsion and the temperature of the water into which the emulsion is dispersed is from 40 to 80 degrees C.

* * * * *

REEXAMINATION CERTIFICATE (1546th)
United States Patent [19]

Shimizu et al.

[11] B1 4,742,142

[45] Certificate Issued  Sep. 3, 1991

[54] METHOD OF PRODUCING SILICONE RUBBER POWDER

[75] Inventors: Koji Shimizu; Mitsuo Hamada, both of Chiba, Japan

[73] Assignee: Toray Silicone Company, Ltd.

Reexamination Request:
No. 90/001,991, Apr. 9, 1990

Reexamination Certificate for:
Patent No.: 4,742,142
Issued: May 3, 1988
Appl. No.: 34,368
Filed: Apr. 6, 1987

[30]  Foreign Application Priority Data

Apr. 17, 1986 [JP]  Japan .................................. 61-89063

[51] Int. Cl.$^5$ ............................................. C08G 77/06

[52] U.S. Cl. ...................................... 528/15; 528/24; 524/861; 524/862

[58] Field of Search ...................... 528/15, 24, 31, 32; 524/861, 862; 525/478

[56]  References Cited

U.S. PATENT DOCUMENTS 4,248,751  2/1981  Willing .............................. 260/29.2

*Primary Examiner*—Melvyn I. Marquis

[57]  ABSTRACT

Powdered, cured silicone rubber in the form of microfine particles is prepared by emulsifying a curable liquid silicone rubber composition in a mixture of water and a surfactant at a temperature of from 0 to 25 degrees C., dispersing the curable composition in water heated to a temperature of at least 25 degrees C. and recovering the resultant cured particles. The liquid silicone and rubber composition is preferably maintained at a temperature of from −60 to 0 degrees C. before being emulsified.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 to 5 is confirmed.

* * * * *